June 4, 1957 G. C. ELLERBECK 2,794,596

BACK-TRANSFER MECHANISM

Filed July 6, 1953 10 Sheets-Sheet 2

June 4, 1957 G. C. ELLERBECK 2,794,596

BACK-TRANSFER MECHANISM

Filed July 6, 1953 10 Sheets-Sheet 3

June 4, 1957 G. C. ELLERBECK 2,794,596

BACK-TRANSFER MECHANISM

Filed July 6, 1953 10 Sheets-Sheet 4

June 4, 1957 G. C. ELLERBECK 2,794,596

BACK-TRANSFER MECHANISM

Filed July 6, 1953 10 Sheets-Sheet 5

June 4, 1957 G. C. ELLERBECK 2,794,596

BACK-TRANSFER MECHANISM

Filed July 6, 1953 10 Sheets-Sheet 6

June 4, 1957 G. C. ELLERBECK 2,794,596

BACK-TRANSFER MECHANISM

Filed July 6, 1953 10 Sheets-Sheet 8

June 4, 1957 G. C. ELLERBECK 2,794,596

BACK-TRANSFER MECHANISM

Filed July 6, 1953 10 Sheets-Sheet 10

2,794,596
Patented June 4, 1957

2,794,596

BACK-TRANSFER MECHANISM

Grant C. Ellerbeck, San Leandro, Calif., assignor to Friden Calculating Machine Co., Inc., a corporation of California Application July 6, 1953, Serial No. 366,335

14 Claims. (Cl. 235—73)

This invention relates to calculating machines and more particularly to a mechanism operable to set the value standing in the accumulator (i. e. product register), or the counter (i. e. quotient register), selectively into a mechanism from which it can be taken into the selection mechanism as desired.

An important object of the present invention is to provide an improved back-transfer machine, i. e., one in which values may be transferred selectively from either the accumulator or the counter (quotient register) into the selection mechanism for use as a factor in the next computation.

A still further object of my invention is to provide an improved mechanism by means of which values standing in either the accumulator or the counter may be transferred into a storage mechanism from which, at the option of the operator, it may be set into the selection mechanism for use in a subsequent computation.

Another important object of my invention is to provide a mechanism by means of which values standing in a register can be sensed by means of stepped cams utilizing small increments between steps, and the amount of such sensing movement multiplied so as to give a substantially greater movement of the conventional selection mechanism.

A still further object of my invention is to provide a mechanism which is operable upon the back transfer of a value from a register or counter into the selection mechanism, to indicate the value set in the machine by automatically depressing the keys corresponding to that value.

Another important object of my invention is to provide a back-transfer mechanism which is operable to transfer the value standing either in the accumulator register or in the counter, or quotient register, selectively at the will of the operator, either directly to provide for its immediate use (i. e., a direct transfer), or indirectly through a storage device from which it can be taken as desired ( i. e., a delayed transfer).

Another object of my invention is to provide an improved mechanism which can be operated selectively to insert a sensed value into the selection mechanism of a conventional calculating machine.

The present invention is concerned with these, and other, objects which will become apparent from the following description of the preferred embodiments of the invention which are shown in the accompanying drawings and in which.

In its preferred form my invention is associated with a calculating machine of the type disclosed in the patent to Friden, No. 2,229,889 issued January 28, 1941. It will be understood however, that my invention could be applied to other commercial calculating machines now available on the market, or even those which have been proposed from time to time and never manufactured. Basically, these machines include an ordinally arranged selection mechanism mounted in the frame of the machine combined with ordinally aligned accumulator and counter dials which preferably are mounted in a shiftable carriage. I provide, in both embodiments of my invention, both the accumulator, or product register, dials and the counter, or quotient register, dials with stepped cams representative of the values therein, and means for sensing the angular position of such cams, preferably with a single sensing member or slide; means positioned by the sensing member for differentially positioning an actuating slide in relation to the keys of the selection mechanism; and means for depressing the actuating slide to depress the selected digital value keys. Preferably, the value cams will have relatively small steps in order to keep them of small size convenient to registers of this type, while the differential stepping of the key-actuating slide will be of considerably greater amount, and in my preferred form I provide means for multiplying the amount of the movement of the sensing member so as to secure the proper differential displacement of the actuating member. Both forms of my present invention, also, involve means for selectively determining whether the value cams of the product register, or accumulator, on the one hand, or the value cams of the counter, or quotient register, on the other hand, will be sensed by the sensing member.

*Conventional machine*

Figures 1, 2:
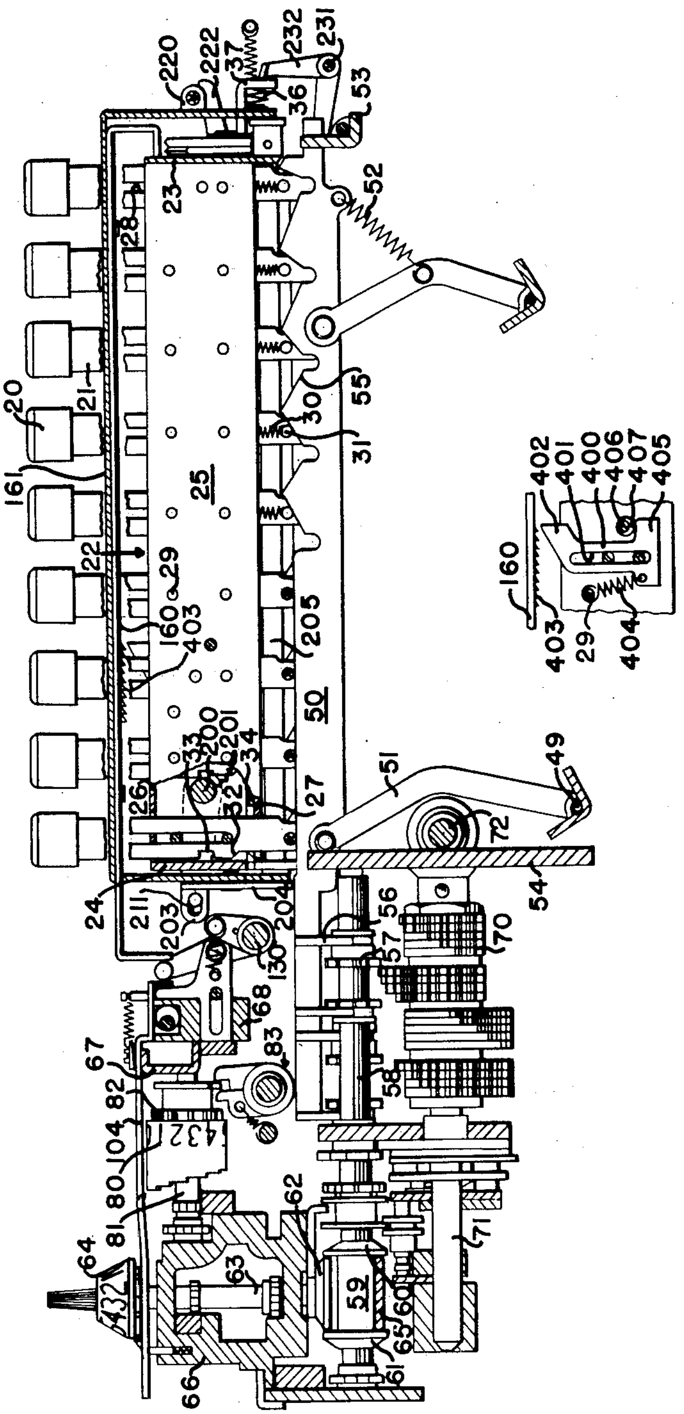
Fig. 1 is a longitudinal cross-sectional view, taken from the left, of an intermediate order of a conventional calculating machine with which both embodiments of my present invention can be associated, showing the improved transfer mechanism of my invention.
Fig. 2 is a detail of a latching mechanism associated with the setting slides shown in Fig. 1 and used in the second embodiment of my invention.
Figure 10:
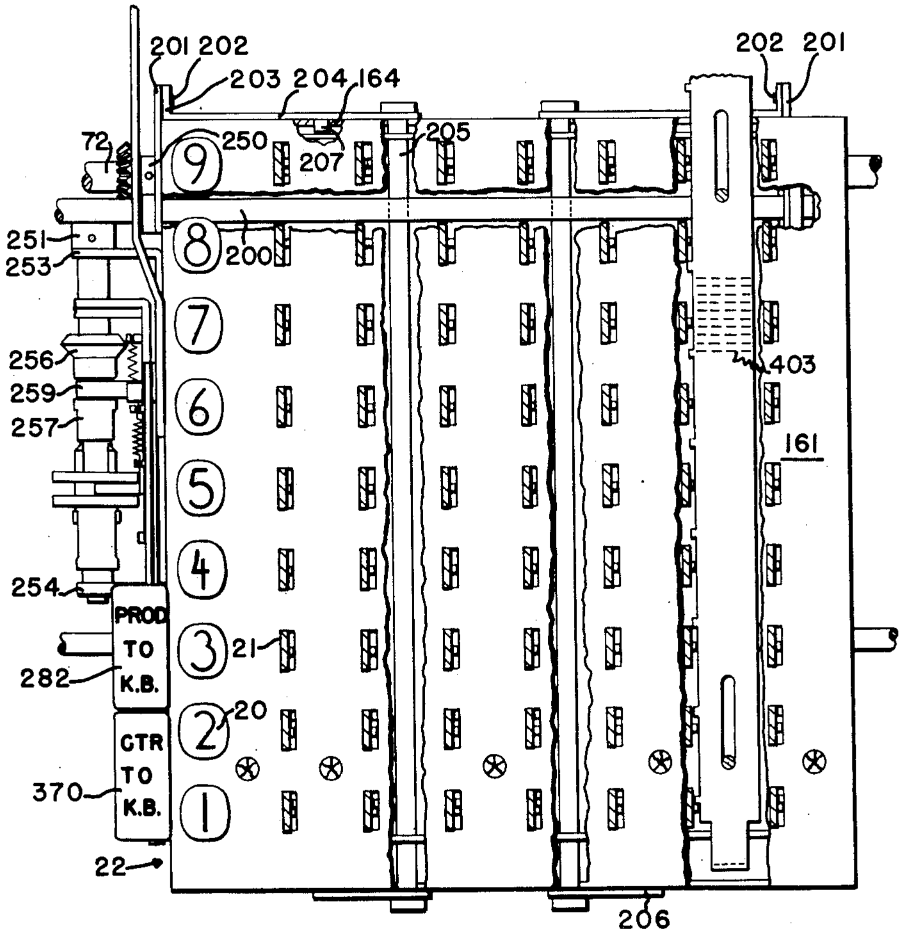
Fig. 10 is a plan view of the keyboard and control mechanism of a preferred form of my invention.

Preferably the mechanism of my invention will be associated with the conventional calculating machine of the patent mentioned. Therefore, so much of the conventional calculating machine as is necessary to a complete understanding of my invention will be briefly described, while those mechanisms not pertinent thereto will not be mentioned. For a more complete disclosure of the conventional machine, or a more complete understanding of the mechanism and method of operation, one is referred to the aforesaid patent. Briefly, the conventional mechanism includes a full keyboard of value keys 20 (Fig. 1), preferably arranged in a plurality of orders (8 orders are shown in Fig. 10), the value keys in each order running from "1" to "9," inclusive. The keys 20 are mounted on key stems 21, which are mounted for vertical movement in a keyboard frame indicated generally at 22, and comprising a front frame plate 23, a rear frame plate 24, side plates 25, top plate 26 and bottom plate 27. It will be understood that the keyboard frame 22 is rigidly secured in the frame of the calculating machine, and serves to support the key stems 21 in a conventional manner. In the machine of said patent, each of the key stems 21 is provided with a longitudinal slot 28 (see Fig. 3) which embraces a pair of tie rods 29 rigidly mounted between the side pieces 25—the tie rods serving to tie the frame 22 rigidly together and also to support the key stems 21 for substantially vertical movement. The keys are resiliently biased to their raised position by springs 30 (Fig. 1) tensioned between studs 31 adjacent the bottom of the key stems and the lower one of each pair of tie rods 29. The key stems are provided with a cam nose 32 (see Fig. 3) and a latching slot 33. A latching slide 34 is slidably mounted in the keyboard frame, as upon the bottom plate 27, and is provided with a number of slots 35 which embrace the various key stems 21 of the particular order. The latching slide 34 is resiliently biased to its forward position as by a compression spring 36 compressed between the frame 22 and a turned-down ear 37 on the front of the slide, as shown in Fig. 1. Depression of a value key 20 causes the cam nose 32 to cam the slide 34 rearwardly against the force of spring 36 until the key stem 21 has been depressed sufficiently for the locking slide to snap into the locking slot 33 formed on the key stem. In this manner a value selected in any order is locked therein until the value is cleared out, either manually or automatically in certain programmed operations of the machine.

A pair of selection bars 50 are associated with each order of keys 20 of the keyboard. These selection bars are mounted on arms 51 pivotally mounted in the machine, as on crossrods 49—the selection bars being resiliently biased toward the rear of the machine by suitable springs 52. The selection bars 50 are held against lateral displacement by slots, or combs, not shown, formed in crossbars 53 and 54. It is conventional in the machine of the patent hereinbefore referred to, to provide a pair of the selection bars 50 for each order of the machine, one of the bars, as shown in Fig. 1, being associated with the "1" to "5" keys of the order while the other serves the "6" to "9" keys thereof. One portion of the selection bars 50 (the forward portion of the "1" to "5" bars and the middle portion of the "6" to "9" bars) is provided with differentially disposed cam faces 55 adapted to be engaged by the pins 31 on the lower end of the key stems 21. The rear end of each of these slides is provided with a right angle yoke 56 which engages an annular slot formed in the hub of a selection gear 57.

Each pair of selection gears 57 are slidably mounted on a longitudinally extending square shaft 58. A digitation spool 59 is mounted on the rear end of this square shaft, also slidable therealong. This spool 59 is provided with a plus gear 60 and a minus gear 61, both of which are meshable with an accumulator gear 62. The gear 62 is mounted on the lower end of the accumulator dial shaft 63, the upper end of which is provided with the conventional accumulator dial 64. The digitation spool can be moved by a digitation control gate 65 which, according to its position, will cause either the plus or the minus gears to mesh with the accumulator gear 62 so as to transmit a value set in the selection mechanism into the accumulator additively or subtractively.

The selection gears 57 are given differential increments of motion, corresponding to their longitudinal position on the square shaft 58, by means of drum actuators 70 provided with the stepped teeth shown in Fig. 1. These actuator drums 70 are mounted upon an actuator shaft 71 driven from the main drive shaft 72, as by conventional miter gears shown. It will be understood that the drive shaft is cyclically operated, conventionally by means of an electric motor (the operation of which is controlled by a motor switch, not shown) through the medium of a cyclically operated clutch, not shown, all of which are of conventional construction and are unnecessary to an understanding of the present invention.

It can be noted, however, that depression of a value key 20 moves the associated selection bar 50 forwardly a differential amount, due to the cooperation of the pin 31 on the key stem with the cam face 55 on the selection bar, thus moving the associated selection gear 57 a differential amount. Such movement of the selection gear 57 places it in the plane of one of the stepped teeth on the actuator drum 70 whereby the rotation of drive shaft 72, actuator shaft 71, and actuator drum 70 will cause the selection gear 57 to be engaged by the number of teeth on the drum lying in the plane of the positionable gear 57. Rotation of the gear 57 and its square shaft 58, through the media of the digitation spool 59 and its associated gears, rotates the accumulator dial 64 and its shaft 63 a differential amount to enter the value selected on the keyboard into the accumulator register.

It is conventional in machines of this kind to mount the accumulator register, including the dial shafts 63 and accumulator gears 62, in a carriage frame bar 66 which is shiftable laterally in the machine. The shiftable carriage permits shifting of the relative decimal positions of the accumulator register with respect to the keyboard and related selection mechanism, thereby providing for operations such as multiplication and division.

A quotient register, or counter, is also mounted in the shiftable carriage 66 to count the cycles of operation. In the machine of the above-mentioned patent the counter is comprised of a plurality of cylindrical dials 80 rigidly mounted on longitudinally extending shafts 81 journalled in the carriage frame bar 66 and carriage rail 67. Each shaft is equipped with a counter gear 82 which is engaged and operated by a counter actuator 83 aligned with the units order of the keyboard 20. The actuator 83 shown in Fig. 1 is the conventional counter actuator found in the Friden automatic calculating machine and is fully shown and described in the patent referred to. It should suffice to say that this actuator is operated in each cycle of machine operation and normally is permitted to engage the aligned gear 82 so as to count the cycles of operation, the counter being disengaged in certain operations as is well-known in the art. It will be understood of course, that any conventional counter and counter actuator can be utilized in connection with my invention, for while I am able, by means of my invention, to transmit the value standing in the counter into the selection mechanism, at the will of the operator, the same would be true even though different types of actuators and counters were used.

It is conventional in commercial calculating machines to provide means for selectively operating the digitation control gate 65 either manually or automatically in certain operations; to clear values from either the accumulator dials 64 or the counter dials 80 or the keyboard 20; to shift the carriage 66 in either direction, either under manual control or automatic in certain operations; to effect a tens-transfer between the respective orders of the accumulator dials 64 and counter dials 80; to selectively block out operation of the counter dials 80 selectively, or automatically in certain selected operations; to effect energizing of the driving motor and engagement of the main drive clutch by operation of the conventional control keys; and to effect certain automatic programmed operations such as multiplication or division. It is assumed that any machine with which my invention would be associated, would have these various features, or most of them, and the mechanisms for controlling them. However, the operation of such mechanisms is not essential to an understanding of my invention and these features have therefore been omitted from the present specification. It will be understood, however, that while these features are not described herein, and for the most part are not shown in the drawings, that they would be included in machines that are built to include the mechanism of my present invention.

*First form (direct transfer)*

The first embodiment, or form, of my present invention relates to a mechanism operative to set a value standing in either the accumulator dials 64 or counter, or quotient register, dials 80, into the aligned orders of the selection mechanism so that such values may be used as a factor in the succeeding machine operation. Mechanisms of this kind are often referred to as "back-transfer" devices, as they enable an operator to transmit, or "transfer," a value accumulated in a register "back" into the selection mechanism. There are two general types of such back-transfer mechanisms:

1. The "clearing" type in which the register is cleared while operatively connected to the selection mechanism so that, as the value is cleared from the register, it is run into the selection mechanism, such as the mechanism shown in my copending application S. N. 225,733, filed May 11, 1951, now Patent No. 2,714,989 issued August 9, 1955.

2. The "sensing" type in which the angular position of the register dial is sensed by some suitable mechanism, such as a cam mounted on the register shaft and sensed by a sensor member, and the sensor operated to effect a setting of the selection mechanism.

My present invention relates to a back-transfer device of the second type.

Back-transfer mechanisms are also classified as:

(*a*) "Direct"
(*b*) "Delayed"

(*a*) The "direct" back-transfer type of machine is one in which the value standing in the register is transferred directly into the selection mechanism and therefore must be used in the next operation of the calculator.

(*b*) The "delayed" back transfer is one in which the value standing in the register is transferred into an intermediate or storage mechanism in which it can be retained indefinitely and, at the will of the operator, transferred from there into the selection mechanism.

In accordance with this classification, the first embodiment herein described is a "direct" back-transfer machine, while the second embodiment is a "delayed."

Figure 3:
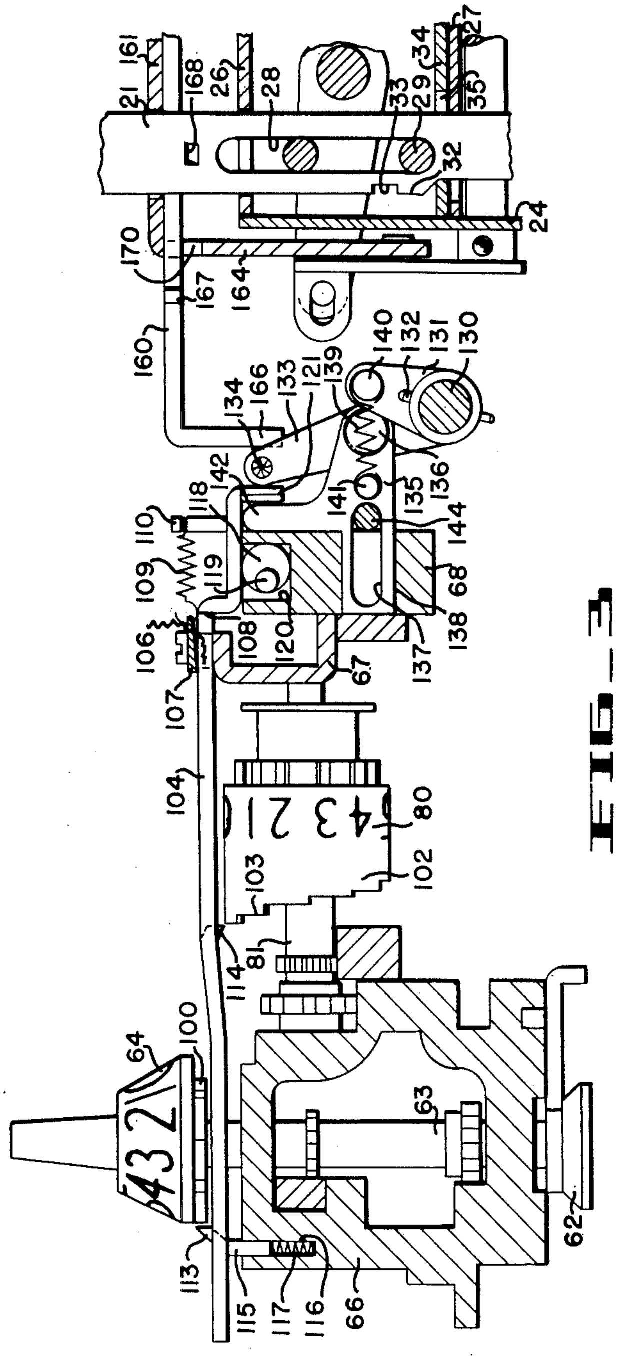
Fig. 3 is an enlarged detail of the main portion of the value sensing mechanism of my invention together with the means for transmitting the sensed value into the selection mechanism.

In my present invention I provide sensing cams mounted on the dial shafts 63 and 81, the angular position of which can be sensed by a single sensing member associated with which is a mechanism for setting one of the ordinally related value keys 20 in a depressed, or value setting, position. The mechanism for sensing the value standing in the two registers is shown particularly in Figs. 3 and 4, and the means for setting those values in the key actuators is shown particularly in Figs. 3 to 6, inclusive. Referring first to the sensing device, it will be seen in Figs. 3 and 4, that each of the product dial shafts 63 is provided with a stepped cam 100 rigidly mounted on the shaft in a plane perpendicular to the axis of the shaft. These cams are provided with ten differentially spaced steps 101 representative of the values "0" to "9." In the form shown, the cams are 180° from the dial setting, as the dials are read from the front and sensed from the rear. It will be understood, however, that this is not necessary as other settings could be used with other sensing means. Similarly, each counter dial 80 is provided with a cam extension 102 provided with differentially stepped cam surfaces 103. It will be understood that, in view of the fact that the counter dials 80 are mounted on a longitudinally extending horizontal shaft while the accumulator dials are mounted on vertical shafts, the cam 102 should be formed as a cylinder mounted on the dial shaft 81 to enable sensing of both cams by a common sensing member. If the counter dials were mounted on vertical shafts, as is true in some calculators, then the counter cam 102 should be formed as a plate cam similar to cam 100. It is essential that the steps in the cams 100 and 102 be of equal depth so that the sensing members will have like movement for equal values, regardless of the cam being sensed. It is very desirable, in order to permit sensing of both cams by a single member, to have the cam surface to be sensed, in adjacent planes so that a single member can be utilized to sense both values, as is shown in Fig. 3.

Figure 4:
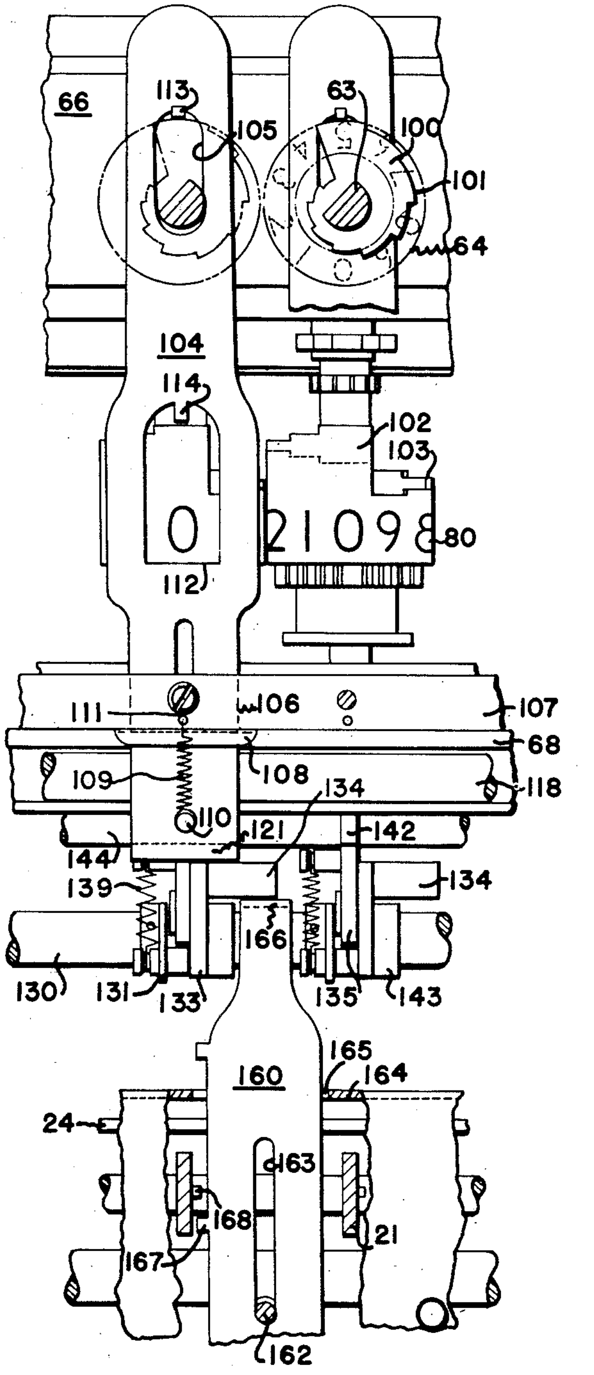
Fig. 4 is a plan view of the mechanism shown in Fig. 3.

In the preferred form of my invention, I provide an ordinal sensing slide 104. The rear end of the sensing slide 104 is provided with a slot 105 adapted to loosely embrace the associated accumulator shaft 63 (as shown particularly in Fig. 4). The forward end of the selection slide rests upon the transverse carriage rail 67 and is held against lateral displacement by a comb member 107 provided with slots 106 adapted to loosely hold the sensing slide 104 against lateral displacement, but to permit free longitudinal movement thereof. Preferably the sensing slide 104 is provided with abutments or stop shoulders 108 which abut against the comb member 107 as shown in Fig. 4, when the slide is in its rearward, or inoperative, position. Normally the slide 104 is resiliently biased to its rearward, or inoperative, position by a spring 109 tensioned between a stud 110 on the forward end of the sensor slide, and a spring seat 111 formed in the spacing comb 107. I prefer to form the sensing slide 104 with an intermediate aperture 112 which forms a window through which the value standing in the counter dial can be seen, as shown particularly in Fig. 4. Each sensor slide 104 is provided with an upturned ear 113, preferably formed at the rear end of slot 105, adapted to engage the steps 101 of the accumulator cam 100, as shown particularly in Fig. 3; and also with a depending ear 114 adapted to engage the steps 103 of the counter cam 102.

I have preferred that the sensor slide normally be conditioned to sense the accumulator cams 100, which can readily be secured by means of a bearing member 115 slidably journalled in a cylindrical hole 116 formed in the carriage frame 66 and biased to an upper position by a compression spring 117. The force of spring 117 normally lifts the rear end of the sensor link, or slide, 104 so that the ear 113 will engage the steps of cam 100 when the slide is translated forwardly, but which will yield to permit the depression of the rear end of the sensor slide to enable the ear 114 to sense the steps 103 on the counter cam 102. One convenient means of positioning the slide 104 to selectively sense the cam 100 or 102 is shown particularly in Fig. 3, and comprises a rotatable eccentric shaft 118, the bearing ends 119 of which are eccentric to the axis of the shaft. The eccentric shaft 118 preferably lies within a channel 120 formed in the upper face of the crossbar 68 forming a portion of the body or frame of the calculating machine with which my invention is associated. It will be obvious that the rotation of the shaft 118 about its journals 119 will lift or lower, as the case may be, the forward end of the sensor link 104. The forward edge of the comb 107 is slightly bevelled, as shown in Fig. 3, to permit the rocking of the sensor link about the front carriage rail 67 as a pivot, upon operation of the eccentric shaft 118. In my preferred construction the shaft 118, in its normal position, will lie in the position shown in Fig. 3, thereby permitting the spring 117 to lift the rear end of the sensor slide 104 to sense the accumulator cams 100. However, upon rocking of the shaft 118 through an angle of approximately 90°, the forward end of the link 104 will be pivoted around the carriage rail 67 to depress the rear end of the sensor slide, whereupon the ear 113 thereof will pass below the cam 100 while the ear 114 will lie in a plane to engage the appropriate step 103 of the counter cam 102. Means for rocking the shaft 118 will be disclosed in connection with the control mechanism of my invention, it being sufficient to mention at this point that the shaft can be so rocked to selectively engage either the accumulator cam 100 or the counter cam 102, at the will of the operator.

Operation of the sensing slide 104 is provided, in the preferred form of my machine, by rocking of a transverse shaft 130. This shaft is provided with a plurality of ordinally arranged short arms 131 which are fixedly secured to the shaft, as by means of pins 132. It will be understood that there is one arm 131 for each order of the machine. Adjacent the fixed arm 131, on the shaft 130, is an arm 133 rotatably mounted on the shaft. This second, or pivotally mounted, arm is held against lateral displacement by a collar 143 secured to the shaft 130 on the one side thereof, and the arm 131 on the other, as is shown in Fig. 4. In the preferred embodiment of my invention, the pivotally mounted arm 133 is considerably longer than the short arm 131 in order to provide for a multiplication of the translatory movement of sensing slide 104, which moves in relatively small steps according to the formation of the cams 100 and 102. This multiplication of the differential movement is provided in order to secure the greater movement required to effect a selection of the conventionally spaced key stem 21, as will hereafter be disclosed. The upper end of the pivotally mounted arm 133 is provided with a relatively long roller 134 which abuts against the turned-down ear 166 on the rear end of the actuating slide 160 to be described hereafter.

The pivotally mounted arm 133 is also provided with a slide 135, pivotally secured thereto, as by pivot pin 136. The slide 135 is slidably mounted in an aperture 138 formed in the cross brace 68. The slide is provided with a slot 137 which embraces a transverse rod 144 rigidly mounted on the forward wall of the cross brace 68 by any suitable means, not shown. A spring 139 tensioned between a pin 140 riveted on the end of the short arm and a stud 141 riveted to the slide 135, biases the slide 135 forwardly as the arm 131 is rocked (clockwise in Fig. 3). The slide 135 is provided with an upwardly extending arm 142 that, in the inoperative position of the parts, abuts against the cross brace 68 and rises to form a shoulder lying behind the turned-down ear 121 on the sensing slide 104. Normally the sensor slide 104 and the interponent slide 135 are resiliently held in the rearward position shown by the force of spring 109. However, when the shaft 130 and arm 131 are rocked (clockwise in Fig. 3) the tensioning of spring 139 overcomes the force of spring 109 and urges both slides forwardly until blocked by ear 113 or 114 engaging its cooperating cam 100 or 102. Movement of slide 135 is operative to position arm 133 in an angular position representative of the value sensed.

In the first portion of a back-transfer operation, the eccentrically mounted shaft 118 will be rocked if the transfer is to take place from the counter dial 80 to the selection mechanism, and thereafter the shaft 130 will be rocked (clockwise in Fig. 3) by means to be disclosed hereafter. The rocking of the shaft 130 obviously will rock the short arms 131 which are pinned, or otherwise rigidly secured, thereto. So long as the sensing slide 104 is free to move forwardly (to the right in Fig. 3) arm 133 and the slide 135 connected thereto, will follow arm 131 from the bias of spring 139. The upper nose 142 of the slide 135, through its engagement with the ear 121 on the slide 104, will pull the slide forwardly until the sensing ear 113 or 114, as the case may be, engages one of the steps 101 or 103 of the sensing cams 100 or 102, respectively. When the sensing ears 113 or 114 engage their respective cams, forward motion of the slide 104 is blocked, which also is operative to block forward motion of the slide 135, the spring 139 yielding to permit the full rotation of the arm 131. By this means, the arm 133 and its roller 134 will rock a differential amount depending upon the value to be sensed by the sensing slide 104, even though the shaft 130 and arm 131 will rock through a full stroke with each back-transfer cycle.

Figure 5:
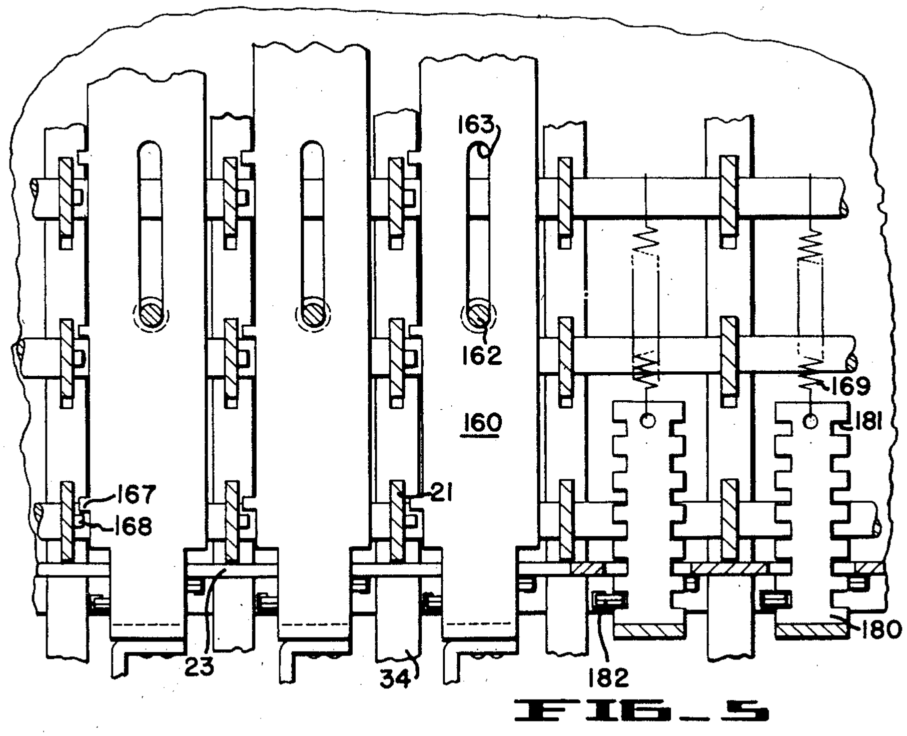
Fig. 5 shows the forward parts of the value setting mechanism, and in effect is the forward part of the material shown in Fig. 4, and relates particularly to the first, or direct transfer, embodiment of my invention.
Figure 6:
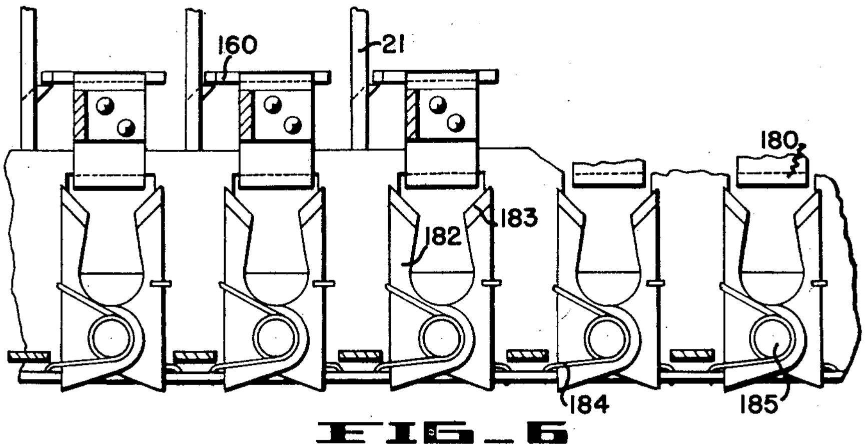
Fig. 6 is a front view of the mechanism shown in Fig. 5.
Figure 7:
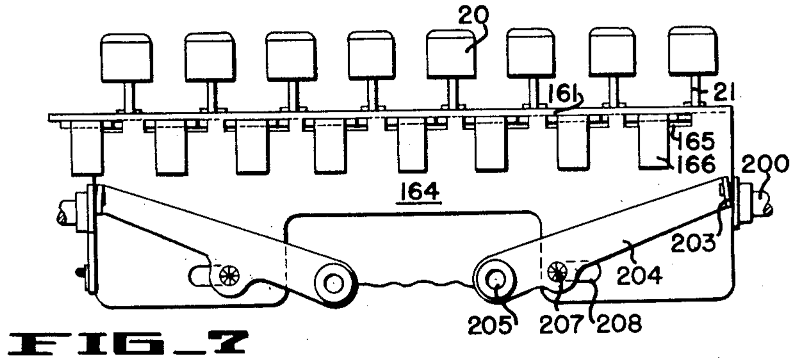
Fig. 7 is a rear view of the keyboard assembly of my present invention, showing particularly means for depressing the selected value keys.
Figure 8:
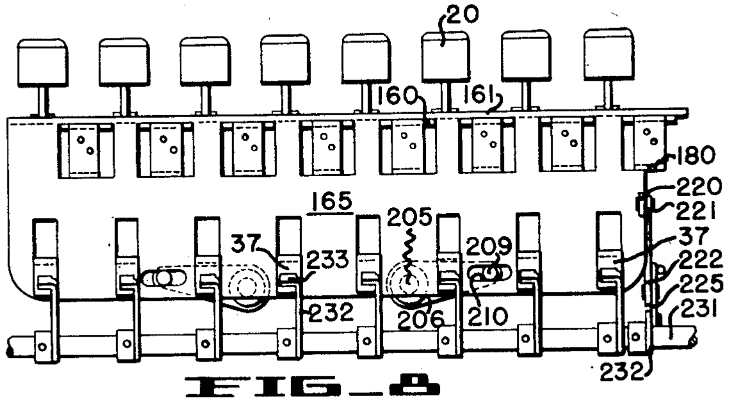
Fig. 8 is a front view of the keyboard assembly shown in Fig. 7.

Sensed values are set in the keyboard of the calculating machine, in the preferred form of my invention, by means of a key-selecting slide 160 resiliently biased toward the rear of the machine by a suitable spring, such as the tension spring 169 shown in Fig. 5, and positioned forwardly by the roller 134 mounted on the operating arm 133 (see Figs. 3 and 4). It will be understood that there is one such slide associated with each order of the back-transfer mechanism. Preferably the slide 160 will be offset laterally from the sensing slide 104, as the latter is best located with its axis of movement along the vertical plane which includes the axes of accumulator shaft 63 and counter shaft 81, while the selecting slide 160 can best be located laterally adjacent the associated key stem, as is shown in Fig. 4. The slides 160, as shown in these figures, can best be supported by means of flat-headed studs, or rivets, 162 which are embraced in longitudinal slots 163 formed in the selecting slides 160, the rivets being affixed in the keyboard cover plate 161. It can be noted at this point that in my preferred form of invention the keyboard cover plate 161 is depressible, and is so depressed in a back transfer operation in order to cause the depression of the selected key stem 21. For the moment it can be noted that the cover plate 161 is provided with a rearwardly dependent skirt 164 (shown in Figs. 3 and 7) and a depending front skirt 165 (shown in Fig. 8). The key-selecting slide 160 extends rearwardly through apertures 170 formed in the rear skirt 164 and at its rearward extremity is provided with a dependent ear 166. It should be noted that the ear 166 is relatively long in order to provide for sufficient engagement between the roller 134 and the ear 166 when the cover plate 161, and with it the slide 160, are in their normal raised positions, and throughout the depression stroke incident to a back transfer operation.

The slide 160 is provided, on the edge adjacent the associated key stems 21, with a plurality of differentially spaced projections, or noses 167. The related key stems 21 are provided with matching projections, or ears, 168 lying in the plane immediately below the normal plane of the slide 160. Thus, the slide 160 is free to move longitudinally without restriction, insofar as the ears 168 on the related key stems are concerned, when the cover plate 161 is in its raised position. However, whenever the cover plate 161 and the slides 160 are depressed in a back transfer operation, a nose 167 on the slide 160 lying above an ear 168 on a key stem 21, will cause the depression and latching of the key stem in the depressed position. It can be noted here that the noses 167 on the key actuating slides 160 are spaced apart relative to one another slightly more than the spacing of the key stems 21 in an order. Thus, if a slide 160 is moved forwardly one step upon the sensing of a value of "1" in either of the register dials 64 or 80, the forward nose 167 (shown in Fig. 5) would overlie the ear 168 on the "1" key 21; while if the sensor slide 104 sensed a value of "2," then the key actuating slide 160 would be moved two steps, whereupon the second nose 167 would overlie the ear 168 of the value "2" key stem 21, etc.

It is desirable, in order to have accurate positioning of the key-selecting slides 160, to have a centralizing mechanism for these slides. Various forms of centralizing mechanisms can be suggested by those skilled in the art, but I prefer the simple form shown in Figs. 5 and 6. The centralizing device comprises a reversely bent portion 180 on the forward end of the selection slides 160. This reversed portion is provided with a plurality of opposed notches 181 designed to cooperate with a pair of scissor-like centralizing arms 182, shown particularly in Fig. 6. In the form shown, the slots 181 are laterally opposite one another and are positioned two differential steps apart, that is, the spacing between adjacent slots is twice the increment of motion of the slide 160 for movement from one differential position to another. The centralizing arms 182 are pivoted on a common pivot member such as a stud or rivet 185, and are therefore staggered one from another, as shown in Fig. 5. These members are so placed that when one of them will engage a slot 181 the other will rest upon the outer edge of the reverse portion 180, as shown in Fig. 5. Then, when the slot 160 is moved forwardly one differential step, the other centralizing member, such as the right-hand ones shown in Fig. 5, will engage the next adjacent slot while the first will ride upon the outer edge of the reverse portion. These centralizing members 182 are pivotally mounted on their common pivots 185 and are urged towards each other by separate torsion springs 184. Each of these sensing arms 182 is provided with a relatively sharp cam nose 183 adapted to cam the slide slightly forward or rearwardly in order to centralize it in the proper position. The mechanism thus described and shown is operative, when the slides 160 are depressed to operate the value keys 20 as follows: One of the arms 182 will engage in a slot 181, the cam nose 183 operating to longitudinally position the slide 160 in its proper position, and will hold the slide 160 in that position throughout the depression and later rise of the slide. The other centralizing arm 182 will yield, against the force of torsion spring 184.

It has previously been mentioned that after the key-selecting slides 160 have been adjusted to their differential longitudinal position corresponding to the value standing in the register being sensed, the keyboard cover 161 (see particularly Figs. 1, 7 and 8) is lowered to depress the keyboard selection slides 160 and thereby depress the one of the value keys corresponding to the differential position of the slide 160. In my preferred form of machine incorporating my invention, the keyboard cover 161 is normally in the raised position shown in these figures. After the setting of the key-actuating, or selecting, slides 160 has been made, the cover plate 161 is depressed, and then raised to its normal elevated position immediately prior to the end of the cycle of the transfer operation. The means for lowering and raising the cover plate will now be described, although the power means for operating this drive mechanism will be described later. Power for this operation is derived from a transverse shaft 200 (shown particularly in Figs. 1 and 10). A pair of arms 201 are rigidly secured to this shaft at points adjacent the sides of the keyboard cover 161. As shown in these figures, the power shaft 200 is adjacent the rear edge of the keyboard plate, and the two arms 201 extend rearwardly beyond the rear end of the plate. The rear end of each of these arms 201 carries a pin 202 which rides within an aperture 211 (shown in Fig. 1) formed in ears 203 on the extremities of arms 204. The arms 204 are rigidly secured to longitudinally extending shafts 205 which extend forwardly to the front apron 165 of the cover plate. A pair of arms 206 (see Fig. 8) are rigidly mounted on the front ends of the shafts 205, lying in the same angle with respect to the shaft as the rearward arms 204. The rear arms 204 are provided with an intermediate stud or rivet 207 (Fig. 7) which is embraced in horizontal slots 208 formed in the rear apron 164. Similarly the forward arms 206 (Fig. 8) are provided with studs or rivets 209 which are embraced in horizontal slots 210 formed in the front apron 165 of the cover plate, the pins 209 being spaced from the shaft 205 the same distance as the pins 207 in the rear arms 204. Thus, the rocking of the power shaft 200 rocks arms 201 which in turn rock the rear arms 204 and the shafts 205 to which they are secured. The forward arms 206 and the rearward arms 204 rock in unison through identical angles, and as their respective pins 207 and 209 are equidistantly spaced from the shafts 205, the cover plate 161 is raised and lowered equal amounts at all four corners. The power operation of the keyboard cover 161 causes similar depression of the keyboard-selecting slides 160 (which are slidably mounted on the underside of the cover plate 161) to depress the value keys 20 in the various orders corresponding to the setting of the register dials in that same order.

Figure 9:
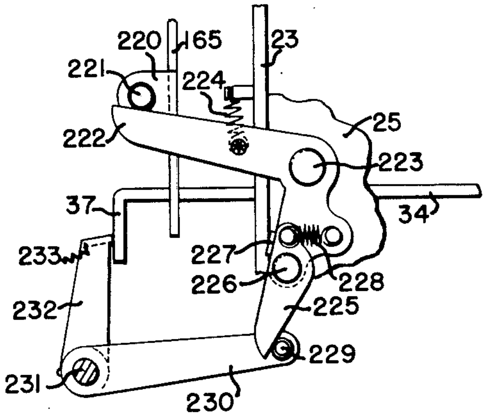
Fig. 9 is a side view of the automatic clearing mechanism shown in Fig. 8.

It is desirable that the depression of the keyboard cover plate 161 operate a means for clearing values set in the keyboard, prior to the depression of the value key stems 21 by the depression of the slide. This is necessary in order to clear the keyboard of any values that might have previously been standing therein, sufficiently ahead of the back transfer operation to enable the various value keys 20 to be restored to their normal raised position. Many means for clearing the keyboard in synchronism with the start of operation of the keyboard cover plate 161 can be suggested. A very simple one is shown in Fig. 9, and to some extent in Fig. 8. It comprises an ear 220 formed on the right edge of the front skirt 165, which ear carries a roller 221. The roller 221 is adapted to engage the forwardly extending arm of a bellcrank 222 which is pivotally secured to the side frame 25 of the key frame by any suitable means, such as stud 223. The bellcrank is resiliently biased to its raised position, in which the arm 222 engages the roller 221, by a suitable spring, such as 224, tensioned between a stud on the bellcrank and a stud on the front frame plate of the keyboard frame 22. The downwardly extending arm of the bellcrank 222 carries a live tip 225 pivotally secured thereto by any suitable means, such as stud 226. The live tip 225 is provided with an ear 227 normally abutting the forward edge of the second arm of the bellcrank, thereby locking the live tip against clockwise rotation, but permitting it to rock counter-clockwise if need be. The live tip 225 is resiliently biased to its extreme clockwise position by any suitable means, such as the spring 228 tensioned between studs on the upper end of the live tip and the lower end of the lower arm of the bellcrank. The live tip 225 is adapted to engage a roller 229 mounted on the rear end of an arm 230 rigidly secured to a transverse shaft 231. The transverse shaft carries a plurality of arms 232 rigidly secured thereto (see Fig. 8), each of which is provided with a perpendicular ear 233 adapted to engage the forward ear 37 on the locking slides 34. Thus, the depression of the keyboard cover 161 rocks the bellcrank 222 (counter-clockwise in Fig. 9), which in turn rocks the arm 230, shaft 231 and clearing arms 232 clockwise. The live tip 225 is so constructed that it will rock out of engagement with its associated roller 229 prior to the full depression of the keyboard cover, thereby permitting the arms 230 and 232 to return to their normal position to condition the locking slides 34 for further operation in order that they may effectively latch down any key depressed by the operation of the back-transfer mechanism herein described.

Figure 13:
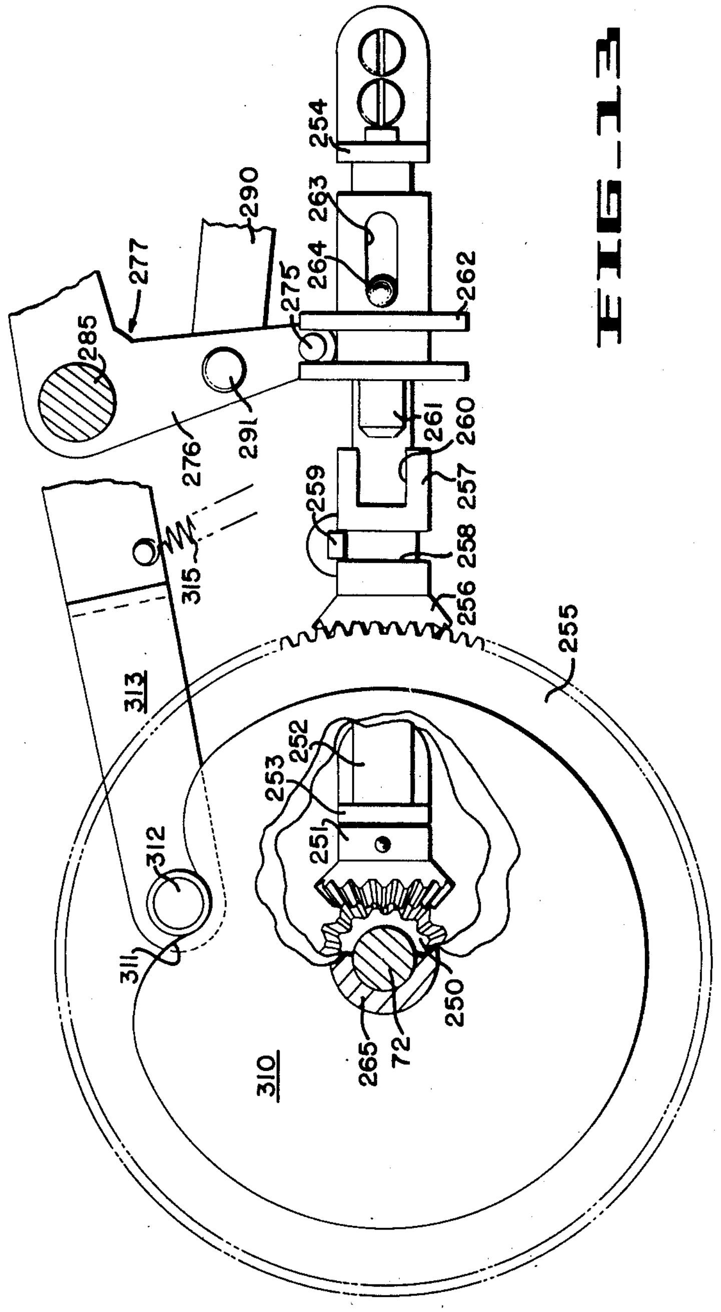
Fig. 13 is an enlarged detail of a portion of the mechanism shown in Fig. 11, and particularly, the means for clutching the transfer control cams of the first embodiment of my invention to the main power shaft of the calculating machine.

The mechanisms heretofore described are driven from the main drive shaft 72 of the machine as will now be described. It is seen, particularly in Fig. 13, that a miter gear 250 is pinned, or otherwise rigidly secured, to the drive shaft 72, adjacent the left-hand side of the machine. A second miter gear 251 meshes with the miter gear 250, the latter gear being pinned, or otherwise rigidly secured, to a longitudinally extending shaft 252 which is journalled in brackets 253 and 254. A large miter gear 255 is rotatably mounted on the main drive shaft 72, meshing with a miter pinion 256 rotatably mounted on the shaft 252. In the preferred form of my invention the three miter gears 250, 251 and 256 have the same number of teeth whereby shaft 252 and gear 256 rotate at the same speed as the main drive shaft 72, while the big miter gear 255 will be much larger in order to secure a large gear reduction. In the preferred embodiment of my invention the large miter gear has six times as many teeth as gear 256, so that six machine cycles are required to give a single cycle of the back-transfer mechanism. It may be mentioned that the Friden machine with which my invention is desirably associated, operates at a speed of 600 R. P. M., so that six cycles for a back transfer operation means that the whole operation takes little more than half a second, which is not objectionable, and as will be pointed out hereafter, the slower speed is desirable in some respects. The small miter gear 256 is provided with an elongated hub 257 in which is milled an annular slot 258. The slot 258 embraces a stud 259 rigidly mounted on the machine frame plate, thereby holding the miter gear 256 against longitudinal displacement on the shaft 252. The hub 257 is also provided with a longitudinally extending slot 260 adapted to embrace a tongue 261 carried by a flanged wheel 262. The flanged wheel is equipped with a slot 263 which embraces a pin 264 riveted or otherwise rigidly secured to the shaft 252. Thus, the flanged wheel 262 constantly rotates with the shaft 252 (which rotates whenever the main drive shaft 72 is rotated) and can be slid longitudinally along the shaft 252 so as to engage or disengage the hub 257 of gear 256.

The flanged wheel 262 is displaced longitudinally along the shaft 252 by any suitable means such as pin 275 carried by the lower arm 276 of a bellcrank 277. The bellcrank 277 is pivotally mounted in the machine, as on pin 285 mounted on a bracket 286 affixed to the keyboard frame. The horizontal arm 278 (see Fig. 11) of the bellcrank 277 is provided with a slot 279 which embraces a pin 280 mounted on the lower end of the key stem 281 of the key 282 which controls the back transfer from the accumulator, or product, register to the selection mechanism, which key is marked "PROD TO K. B." in Fig. 10. This key is resiliently biased to its raised position by a spring 283, and is mounted in the machine in a conventional manner for substantially vertical movement, as by means of a slot 284 in the key stem embracing the through rods 29 of the keyboard frame. Thus, the depression of the key 282 rocks the bellcrank 277 (clockwise in Figs. 11 and 13), urging the doubly flanged wheel 262 to the rear on shaft 252 so that its tongue 261 engages in the slot 260 of the hub of gear 256 to connect the gear 255 to the main drive shaft 72.

Figures 11, 12:
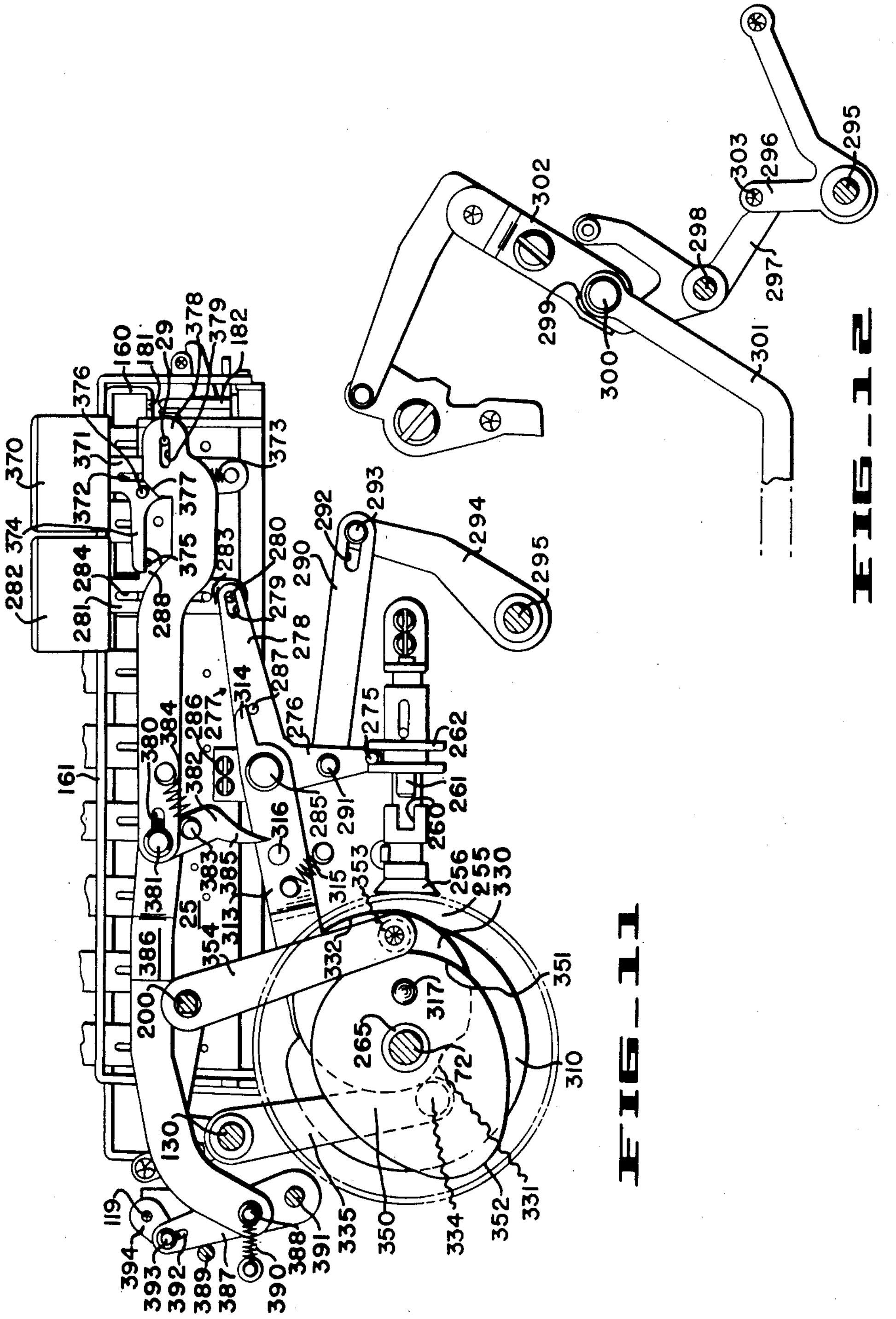
Fig. 11 is a left side view of the mechanism of the first embodiment of my invention showing particularly the control cams and associated mechanisms in their full-cycle positions.
Fig. 12 is a left side view of the clutch and motor control mechanism mounted on the right end of shaft 295 shown in Fig. 10.

The rocking of bellcrank 277 is also operative to close the motor switch and cause engagement of the main drive clutch, so as to cause operation of the machine, and to hold it in operation throughout the machine cycles required for the complete transfer operation. This means can be secured readily by means of a link 290 pivotally mounted on the arm 276 as by stud 291. The forward end of the link 290 is slotted, as at 292, to embrace a pin 293 carried on the extremity of arm 294. The arm 294 is rigidly secured to a transverse shaft 295. The shaft 295 extends entirely across the machine, and is provided at its right end, as shown in Fig. 12, with a two-armed lever 296. The right arm of the lever 296 is used in other machine operations, but is of no importance to the present invention. The vertically extending arm, however, carries a pin 303 which engages the lower arm of a three-armed lever 297 mounted on a transverse shaft 298. The upper, and rearwardly extending, arm of the three-armed lever 297 is provided with a shoulder 299 which abuts against a pin 300 connecting the switch control link 301 to the clutch control lever 302 which is pivotally mounted on the right side frame. The operation of the clutch control lever 302 and switch link 301 are conventional, as shown in the patent to Hopkins, No. 2,666,580, so that it need only be mentioned that the clockwise rocking of the three-armed lever 297 pulls the switch control link 301 forwardly to close the motor switch, and rocks the clutch control link counter-clockwise to cause engagement of the clutch. Such rocking of lever 297 is secured by the counter-clockwise rocking of shaft 295 and lever 296 mounted on the right-hand end thereof.

It is desirable, in a mechanism of this kind, to provide means to hold the clutch engaged throughout the back transfer cycle. It is conventional in calculating machines with which my invention could be associated, to provide full-cycle mechanisms to insure that depression of any control key will cause a full cycle of operation to return the parts to their normal condition. Specifically most machines of this kind have a full-cycle clutch which is operative to hold the clutch engaged for a full cycle of operation and to hold the motor switch closed throughout that period. Thus, the depression of the transfer key 282, through the linkage described and the rocking of shaft 295, is effective to close the motor switch and cause engagement of the clutch whereupon the conventional full-cycle mechanism keeps the clutch and motor switch operative for a single cycle of operation. Before the end of that cycle it is desirable to provide additional means to hold the flanged wheel 262 in engagement with the hub 257 throughout the further periods required for the transfer operation. This result can be secured by a number of well-known means, but I prefer to use a cam 310 preferably mounted on the hub 265 of the large miter gear 255, and preferably further secured thereto by means of a pin 317 (shown in Fig. 11), which extends through the miter gear 255, cam 310 and the other control cams to be hereinafter described so as to provide a unitary cam structure. The cam 310 is provided with a single depression 311 (Fig. 13) with a relatively steep rise on each side of the full-cycle position in order to provide for movement of the follower from one extreme position to the other within a relatively small angle of rotation of the cam. Associated with the cam 310 is a follower roller 312 engaging the periphery of the cam, which roller is mounted on an arm 313. The arm 313 is mounted on the stud 285 which also supports the bellcrank 277. The cam follower arm 313 is resiliently biased into engagement with the cam by means of a suitable spring, such as the tension spring 315. The forward end of the lever 313 is provided with a nose 314 (Fig. 11) adapted to engage a pin 287 on the forward arm 278 of the bellcrank 277. Thus, the rocking of the lever 313 (clockwise in Figs. 11 and 13) caused by rotation of the cam 310, by means of the engagement of nose 314 with pin 287, is effective to hold the bellcrank 277 in its clockwise position to retain the clutch comprising the hub 257 and flanged wheel 262 in engagement. This guarantees that the last-mentioned clutch not only will be held in engagement, but shaft 295 will be retained in its effective, or operative, position until the cam 310 has completed a full cycle of operation and the roller 312 has again dropped into the depression 311. The mechanism so described is also effective to properly centralize the control mechanism at the end of a back transfer operation.

Figures 17, 18:
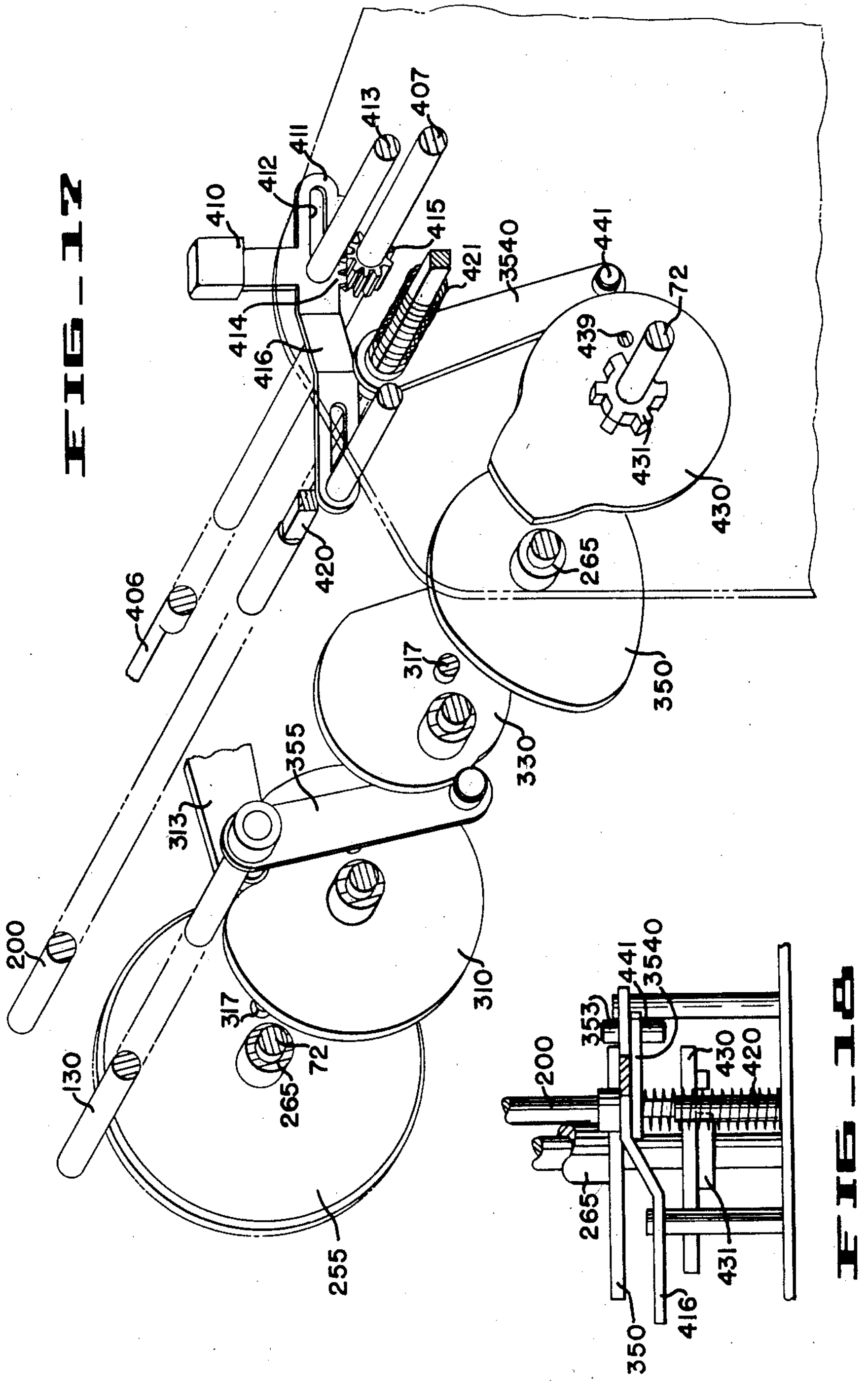
Fig. 17 is an exploded perspective view of the control cams associated with the second embodiment of my invention.
Fig. 18 is a plan view of the value selecting cams shown in Figs. 14 and 17.

The means for rocking the sensing control shaft 130, the operation of which controls the operation of the sensing slides 104 and the setting of the key-selection slides 160, is preferably derived from a cam 330 also mounted on hub 265 and secured to the miter gear by the pin 317. As shown in Figs. 11 and 17, the cam 330 lies adjacent and to the left of the centralizing cam 310 in this embodiment of my invention. This cam is shown in Fig. 11 in its full-cycle position, the miter gear 255 and the cams rotating in a clockwise direction. There is a cam follower arm 335 provided with a follower roller 334 at the lower end thereof associated with the cam 330, the roller being adapted to engage the periphery of the cam. The follower arm 335 is rigidly secured to the operating shaft 130, the rocking of which operates the sensing slide 104 and the key-selection slide 160, as previously described. The cam 330 is provided with a dwell 331 of constant radius (shown in Fig. 11) extending rearwardly (counter-clockwise) toward the roller 334, when the cam is in its full-cycle position. The length of this dwell corresponds to the angle intersected by the depression 311 of cam 310 whereby the follower arm will not be rocked during the angle taken for the rocking of the centralizer arm 313 from its full cycle to its fully operative position. Following the dwell 331 the cam is provided with a gradual rise to approximately the 150° position, which rise is effective to rock the follower arm 335 to its fully operative position at approximately the mid-point of back-transfer cycle. There is then a high dwell 332 at the high point of the cam 330 extending over an arc of approximately 60° in order to hold the shaft 130 in its fully operative position at the start of the operation of the mechanism operative to effect the lowering and raising of the cover plate 161, which will next be described. Following the dwell 332 at the high point of the cam, the cam gradually decreases in radius to approximately the full-cycle position.

The mechanism which is operative to control the depression of the cover plate 161, and its return to the normal position, is preferably controlled by a third cam 350, likewise rigidly mounted on hub 265 of the miter gear, and tied to the latter and to the other control cams by the pin 317. The periphery of this cam is engaged by a roller 353 mounted on the lower end of a follower arm 354, the arm being rigidly mounted on shaft 200. The cam 350 is formed with a uniform minimum radius extending through an angle of nearly 150° from the full-cycle position, and thereafter with a relatively sharp rise 352 which reaches its maximum radius at approximately 200° to 230° and thereafter gradually returns to the normal radius of the cam. Thus, the arm 354 will remain stationary through the 150° required for the operation of the value sensing and setting mechanism controlled by follower arm 335. When the follower arm 335 reaches its maximum extent the follower arm 354 begins to rock, thereby rocking shaft 200 and the cover plate operating mechanism previously described to begin the depression of the cover plate 161. During the period that the roller 334 is engaging the dwell 332 on cam 330, the arm 354 will have rocked through a sufficient angle to depress the cover plate 161 and slide 160 to enable the centralizing arms 182 to engage the appropriate notch 181 and thereby centralize the slide 160 in the correct differential position. Thereafter, the sensing mechanism can gradually be returned to its full-cycle position but the slide 160 will be held in the adjusted position by means of the centralizer arms 182 until the cover plate 161 has completed its downward stroke and thereby set the value in the keys 20, in fact until the cover plate has returned to practically its normal raised position. Thus, by the construction of the cams and their angular arrangement as shown and described, in a direct back-transfer cycle the value in the register is first sensed and the keyboard setting slide 160 set in a corresponding differential position, after which the cover plate is depressed to set the selected value in the keyboard 20.

The mechanism heretofore described has provided for the operation of the sensing slide 104 and the keyboard setting slide 160, which in their normal positions are operative to sense the value standing in the accumulator, or product register, dials 64 and to insert that value in the keyboard. However, I prefer that my mechanism be operative also to sense a value standing in the counter dials 80 and means is therefore provided for sensing this value. The sensing of the counter value is controlled by depression of a key 370 which, as shown in Fig. 10, can be indicated by "CTR to K. B.". This key is mounted on a key stem 371 (see especially Fig. 11) of conventional construction, which includes a slot 372 which embraces a vertical pair of crossbars 29. The key stem is biased to its raised position by a suitable spring 373 tensioned between a stud on the lower end of the key stem and one of the crossbars 29. The key stem 371 is modified to provide a rearwardly extending arm 374 which overlies a pin 375 on a projection 288 formed on the key stem 284 previously described. Thus, the depression of the counter back-transfer key 375 is first operative to depress the product back-transfer key to initiate the operation of the large miter gear 255 and the cams associated therewith, as previously described. The key stem 371 is further modified by the provision of a stud 376 thereon, which stud overlies the cam face 377 on a longitudinally extending link 378. The link 378 is mounted for longitudinal movement on the frame, by means of a slot 379 in the forward end thereof embracing one of the crossbars 29 and a slot 380 adjacent the rear end embracing a pin 381 mounted on the upper end of a cam lever 382. The cam lever is pivotally mounted on the left side plate 25 of the keyboard plate, as shown in Fig. 11, by any suitable means, such as stud 383. The link 378 is resiliently urged to the rear, by means of a suitable spring 384 tensioned between the pivot stud 383 and a stud on the link. The lower end of the camming lever 382 is provided with a cam nose 385 shaped as shown in Fig. 11. When the accumulator back-transfer key 282 is depressed, a pin 316 on the centralizing lever 313 rises behind the cam point 385 of the lever 382, and is therefore ineffective to rock the lever 382. However, when the counter back-transfer key 375 is depressed, the action of the pin 376 in camming link 378 forwardly rocks the camming lever 382 (clockwise in this figure), so that the point 385 overlies the pin 316. Thereupon the rocking of the centralizing lever 313 and the pin 316 throws the cam lever 382 to its extreme clockwise position immediately after the start of the cycle of operation and before rocking of follower arms 335 and 354.

A second link 386 has its forward end pivotally supported on the stud 381 and and is therefore pulled forwardly upon the rocking of the cam lever 382. The rearward end of this link is pivotally supported, as by stud 388, on an arm 387. The arm 387 is pivotally mounted upon any suitable means, such as transverse shaft 391, and is resiliently urged against a stop pin 389 by any suitable means, such as spring 390. The upper end of the arm 387 is provided with a slot 392 which embraces a pin 393 riveted on, or otherwise rigidly secured to, the rearward end of a short arm 394. The short arm 394 is rigidly secured to the journal 119 of the eccentric shaft 118. Thus, the rocking of the lever 382 caused by the engagement of its cam nose 385 with pin 316, is effective to rock arm 387 (clockwise in Fig. 11) and the arm 394 to rock eccentric shaft 118 through an angle of approximately 90°. The rocking of shaft 118 lifts the forward end of the sensing lever 104 thereby depressing the rear end thereof so that the ear 113 misses the cam 100 while the ear 114 is effective to sense the cam 102 on the counter dials 80. Thus, by depression of the control key 370, the operator is enabled to transfer the value from the counter register dials 80 into the ordinally related keyboard 20.

It might be presumed that the forward translation of the selection slides 50 which occurs as a value is being set into the keyboard from one of the registers in the latter part of the transfer cycle, at a time when the actuators 70 are turning (they rotate in synchronism with the main drive shaft 72 at all times) might cause jamming. However, it has been found that this is not the case. It must be remembered that the forward translation of the selection slides 50, and the consequent longitudinal movement of the selection gears 57, is relatively slow with respect to the turning movement of the actuator drums 70. While it is probably true that occasionally the side of the selection gears 57 will abut against the end of one of the staggered teeth on the actuator drum, there is enough spring in the mechanism to permit a momentary blocking without causing jamming of the machine or the breakage of any parts thereof. The actuator teeth comprise only a minor portion of the circumference of the drum so that such contact of the edge of the teeth is momentary and the actuator drums have passed away from the selection teeth before any damage can result. Even if the selection gears are turned during such movement, it is not effective upon the machine because the digitation control sleeve 59 is in the neutral position at all times, unless the machine is operating under the control of one of the other operation control keys. Thus, it has been found that practically the mechanism shown is entirely satisfactory. If it were deemed otherwise it would be obvious to provide means for disabling the turning of the actuator shafts 71, during the back transfer operation.

*Second form (delayed transfer)*

The second embodiment of my invention, while quite similar to that previously described, is effective to store the transferred value in the key-actuating slides 160, which are locked in their adjusted position. In this form the transferred value is stored until the operator desires to enter it into the keyboard and use it for a factor in a calculation. This form essentially is that of the first embodiment with added means for disabling the lowering and raising of the keyboard cover during the transfer cycle, means for latching the key-actuating slides in their adjusted position, and with an added means for causing the depression of the keyboard cover plate 161 at the will of the operator in order to enter the stored value into the selection mechanism. These mechanisms are shown particularly in Figs. 2 and 14 to 18, inclusive. The mechanism, insofar as it relates to the sensing of either the accumulator or counter values, and the setting of the key-actuator slides 160 from such sensing, is identical with that of the previous form, and the mechanism therefor is operated by the cam 330 as previously described. In the second embodiment, however, it is necessary to add a means for latching the key actuating slides 160 in their adjusted positions, and a simple means therefor is shown in Fig. 2. A preferred form of such latching means can comprise an ordinarily arranged latching means 400, one for each key-actuator slide 160. These latches can be small links provided with a slot 401 which embrace a pair of tie rods as shown. The latch is provided with a sharply pointed nose 402 which is adapted to engage a set of ratchet teeth 403 formed on the lower side of the key-actuator slide 160, which teeth can be formed by any suitable means such as stamping. The latch is normally biased to a raised position by a suitable spring 404 tensioned between a spring seat formed in the base of the latch and one of the tie rods 29. The latches 400 are formed with a horizontally extending base portion 405 which underlies a transverse shaft 406. This shaft 406 is formed with eccentric journals 407, whereby the rotation of the shaft through an angle of approximately 180° will raise or lower the latches 400. When the shaft is in the position shown in Fig. 2, the latches 400 are depressed so that when the keyboard cover, and the key-actuating slides 160 affixed thereto, are in their raised position they will not be engaged by the nose 402 of the latches. However, if the shaft 406 is rocked through an angle of approximately 180°, the latches will be allowed to rise a distance sufficient to enable the nose 402 thereof to engage the rack 403 when the key-actuating slide 160 and keyboard cover are in their raised positions. It will be noted that it is immaterial whether the key-actuating slides 160 engage the latch 402 during depression of the keyboard cover and slide, as the latches are free to move downwardly against the biasing force of spring 404. Also, the teeth 403 are formed so as to prevent return movement of the slide 160, when engaged by a latch 400, but not to interfere with the forward setting movement of the slide.

A means for rocking the shaft 406 to control the position of latches 400 is shown in Fig. 17, and comprises a key 410 which is mounted on a longitudinally extending link 411. The link is provided with a pair of slots 412 which embrace a pair of long pins 413 extending inwardly from the left side auxiliary, or control, plate. Thus, the key 410 and slide 411 are free to be moved forwardly or rearwardly at the will of the operator. Obviously such a mechanism can be provided with a detent, not shown, if desired. The slide 411 is formed with an integral rack 414 which meshes with a pinion 415 mounted on the eccentric hub 407. Thus, if the key 410 is moved rearwardly or forwardly by the operator, the rack 414 will cause the gear 415, and the shaft 407 on which it is mounted, to rotate sufficiently to control the position of the latches 400. This enables the operator to determine whether or not the transferred value will be latched in the key-actuating slides 160 at the end of the slide setting operation.

Movement of the link 411 forwardly to the position shown in Fig. 17, which is effective to rock the shaft 407, 406 from the disabled position shown in Fig. 2, to enable operation of the latches 400, is also effective to disable the operation of the keyboard cover from the rotation of cam 350. This can be readily secured by forming the link 411 with a cam face 416 which engages the follower arm 3540, corresponding to arm 354 in Fig. 11. In this form the left end of the shaft 200 is squared, as shown in Fig. 17. The follower arm 3540 has a square aperture which fits over the squared portion 420 of shaft 200 whereby the follower arm can be shifted longitudinally of the shaft, but is nonrotatably mounted thereon. A compression spring 421 embracing the shaft 420 and compressed between the arm 3540 and the left side control plate of the machine, normally biases the arm 3540 to the right, in which position the roller 353 on the lower end thereof engages the periphery of cam 350. However, when the link 411 is pulled forwardly to the position shown in Fig. 17, the cam face 416 forces the follower arm 3540 to the left, against the compression of spring 421, moving the roller 353 out of the plane of cam 350 and a similar roller 441 (preferably mounted on the same stud as roller 353) into the plane of a second cam 430, likewise rotatably mounted on drive shaft 72. This latter cam will be controlled, as will be presently described, by a secondary transfer means, whereby it will be actuated at the will of the operator to cause depression of the keyboard cover and the consequent entry of values set in the key-actuating slides 160 into the selection mechanism.

Figure 14:
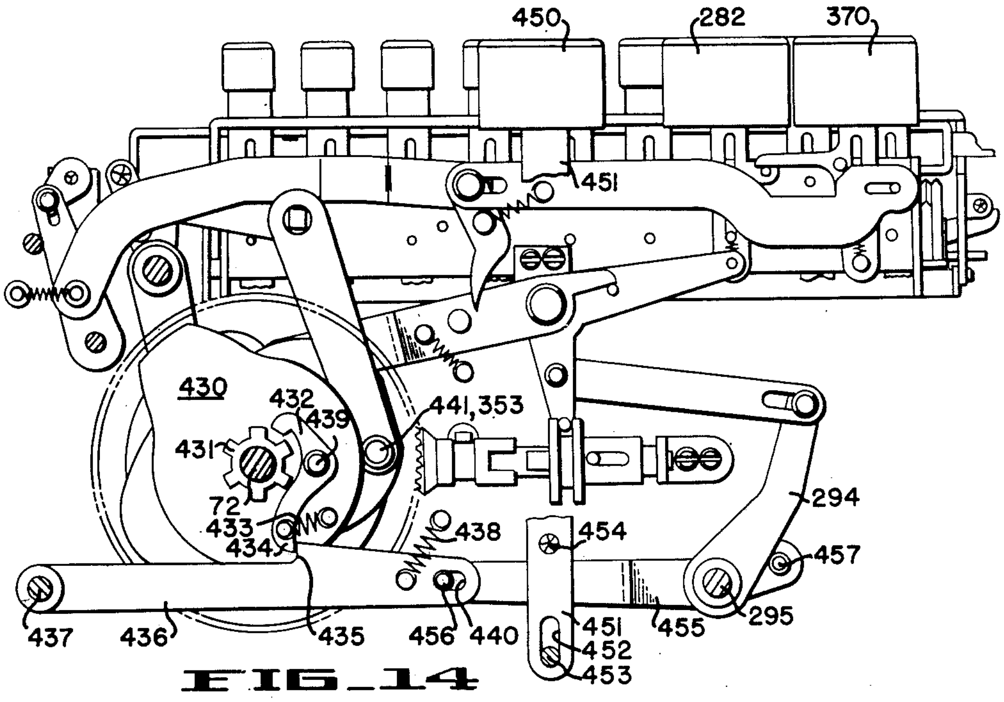
Fig. 14 is a left side view of the mechanism of the second, or delayed transfer, embodiment of my invention, i. e., the form in which the value taken from the registers can be stored in a storage mechanism and then used as desired.

In the preferred form of my second embodiment, the secondary cam 430 is driven directly from the drive shaft 72 by means of an auxiliary clutch comprising a ratchet wheel 431 keyed or otherwise rigidly secured to the drive shaft 72. A clutch dog 432 is pivotally mounted on the cam 430, as upon the pin 439. The dog 432 is normally biased into engagement with the ratchet 431 by a suitable spring, such as 433, tensioned between studs on the lower end of the dog and the cam, as shown in Fig. 14. Normally the clutch 413, 432 is held disengaged by means of a shoulder 435 on lever 436 engaging the tail 434 of the clutch pawl 432, rocking the latter to the clockwise position shown. The lever 436 is pivotally mounted on a suitable stud 437 and is biased to a raised, or blocking, position by a suitable spring 438 tensioned between a stud on the forward end of the lever 436 and the left side frame plate.

Operation of the clutch lever 436 can be secured by depression of a transfer control key 450 mounted upon a long stem 451. The stem can be mounted to the right of the left side auxiliary frame plate by any suitable means, such as slots 452 in the key stem engaging pins 453 secured to the frame plate. The key stem is provided with a pin 454 which overlies a lever 455 pivotally mounted on transverse shaft 295 previously mentioned. The rear end of the lever 455 is provided with a pin 456 which is embraced in a slot 440 formed in the forward end of clutch control lever 436. Thus, depression of the key 450 and its stem 451 causes the pin 454 to rock the lever 455. Rocking of the lever 455 (counter-clockwise in Fig. 14), through the medium of the pin and slot connection 456, 440, rocks the clutch dog 436 (clockwise in Fig. 14) to disengage the tail 434 of the pawl 432, thereby enabling it to engage the ratchet 431 and thus clutch the cam 430 to the power shaft 72. The forward end of the lever 455 is provided with a pin 457 lying below the forward edge of lever 294 so that the rocking of the lever 255 is also operative to close the motor switch and cause operation of the main clutch, without changing the normal disengaged setting of clutch 262, 260 which is controlled by either of the keys 282 or 370 as previously described. Thus, when the key 450 is depressed, the motor is operated, the main clutch engaged, the auxiliary clutch 432, 431 is likewise engaged and cam 430 is rotated. If the control key 410 has been pulled to its forward position to cam the follower arm 3540 to the left so that its roller 441 is in the plane of the periphery of cam 430, then the rotation of the cam will cause the lowering and raising of the keyboard cover to set the value standing in the key-actuating slides into the selection mechanism.

Figure 15:
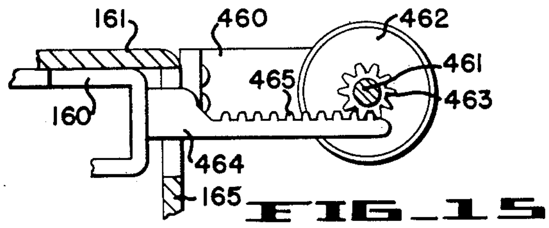
Fig. 15 is a detail of the forward end of the key-actuating slides conveniently used in the second embodiment of my invention.
Figure 16:
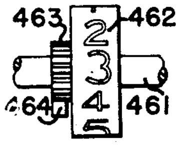
Fig. 16 is a front view of the mechanism shown in Fig. 15.

In connection with the second embodiment of my invention I prefer to provide means for continuously indicating the value, if any, standing in the various key-actuating slides 160, and a simple form of such mechanism is shown in Figs. 15 and 16. Such a mechanism may comprise a pair of brackets 460 mounted on the keyboard cover 161, and extending forwardly of the front skirt 165. A transverse shaft 461 is journalled in the two brackets, and carries a plurality of rotatably mounted dials 462 carrying indicia thereon as shown in Fig. 16. A pinion 463 is rigidly secured to each dial 462. An arm 464 extends forwardly of the key-setting slide 160 and is provided with an integral rack 465 which meshes with the pinion 463. The dial 462 can be viewed by the operator through a window, not shown, in the forward cover of the machine. It will be obvious, therefore, that as the key-actuating slides 160 are differentially positioned by the sensing of the values in the registers, the translation of the arm 464 will cause rotation of the dial 462 to indicate on the dial the value standing in slide 160. Thus, the operator, at all times, will know what value is stored in the slides 160.

If the operator desires to clear the value from the selection slides 160 this is readily secured by moving the key 410 to the rear (to the left in Fig. 17) to rotate the shaft 406, 407 to the position shown in Fig. 2. Such rotation of the shaft causes lowering of the latches 400 so that they no longer engage the slides 160 and the latter are thereupon returned to their normal "0" position by means of their springs 169 previously described.

*Operation*

The operation of the mechanism of the present invention is believed apparent. However, it can be briefly summarized by pointing out that depression of the accumulator transfer key 282 is effective, through the rocking of the bellcrank 277, to rock the motor and clutch control shaft 295 to cause engagement of the main drive clutch and the energizing of the motor. The same rocking of the bellcrank 277 is also effective to close the clutch composed of the hub 257 and the flanged wheel 262 thereby driving the large miter gear 255. The first few degrees of rotation of the miter gear causes the cam 310 to rock the centralizer arm 313 thereby holding the motor energized and the two clutches in engagement until the completion of the transfer cycle. Rotation of the large miter gear is then effective, by means of cam 330 and the consequent rocking of its follower arm 335 to rock shaft 130. The rocking of shaft 130 rocks arms 131 secured thereto. The rocking of the arms 131, through the medium of springs 136 biases the slides 135 forwardly, thereby pulling the sensing slides 104 forwardly until forward progression is blocked by either ear 113 engaging cam 100, or ear 114 engaging cam 102, and simultaneously moves the key-selecting, or actuating, slide 160 forwardly a differential amount. Movement of the latter slide causes one of the projections 167 to overlie the ear 168 on one of the key stems 21.

After the arm 335 has been rocked to its fully operative position, cam 350 then rocks its follower arm 354 to cause depression of the keyboard cover 161 and the selection slides 160 which are mounted on the underside thereof. The rocking of arm 354 rocks shaft 200 to which it is rigidly secured, and this in turn rocks arms 201. The rocking of arms 201 is operative to rock arms 204 which are secured to shafts 205 and simultaneously rock the arms 206 secured thereto. The rocking of arms 204 and 206 lowers the keyboard cover so that one of the projections on each selection slide 160, engaging the appropriate ear 168 of one of the key stems 21, depresses that key until it is latched in its operative position. In this manner the value originally in the register is back transferred into the selection mechanism.

If the operator desires to transfer the value standing in the quotient register into the selection mechanism, then the key 370 is depressed. The depression of this key is effective to operate the mechanism previously mentioned, and also to set the cam lever 382 in a position to be rocked by the movement of the centralizing arm 313. The rocking of lever 382 through the linkage described, rocks the eccentric shaft 118 to lift the forward end of the slide 104 and thereby sense the counter dials 80 rather than the accumulator dials 100.

If the operator desires to store a value in the key-actuating slides 160, he first pulls the key 410 forwardly (to the position shown in Fig. 17) and then depresses either key 282 or 370 depending upon whether he desires to transfer the value from the accumulator or the counter. This operation enables the latches 400 to engage the key-actuating slides 160 when the latter are in their extreme raised positions, and thus holds a value set therein. It also causes translation of the follower arm 3540 to the left, so that its follower roller 353 is out of the plane of cam 350 and follower 441 is in the plane of cam 430. In this position of the follower arm, the depression of either of the control keys 282 or 370 will cause the various operations, previously described, except that cam 350 no longer engages the follower roller 353 and thus the keyboard cover will not be depressed. However, the value transferred from the appropriate register will be stored in the key actuating slides 160 so long as desired by the operator. Thereafter when the operator desires to use the factor so stored, he depresses key 450 which enables clutch members 432, 431 and also rocks shaft 295 to cause operation of the motor and main clutch. Thereupon the cam 430 is rotated by the main drive shaft 72, rocking follower arm 3540 to operate the cover-operating mechanism as previously described.

Manifestly the arrangement shown and described is capable of considerable modification by persons skilled in the art, and any such modifications as are in keeping with the description and claims which follow, are considered to be within the present invention.

I claim:

1. In a calculating machine having a plurality of ordinally arranged value keys and a register containing a plurality of ordinally arranged dials, the combination which comprises a value cam having abutment faces representative of the various digital values connected to each such register dial, sensing members operable to sense the position of said cam faces, a positionable value setting member associated with each ordinal set of keys and positionable in a longitudinal direction along said set of keys to represent various digital values, resilient operating means for biasing said sensing members into sensing engagement with said cams and for positioning said setting members in accordance with the position of said sensing members, a plurality of spaced projections on each of said setting members, cooperating engageable means on said keys, the different value positions of said setting member being effective to align one of said projections with the engageable means on the appropriate key, and means for moving the setting members in a vertical direction along the keys to cause the aligned projection thereon to engage the associated engageable means and thereby operate the appropriate key.

2. In a calculating machine having a register containing a plurality of ordinally arranged dials and a keyboard containing a plurality of ordinally arranged value keys, the combination which comprises a value cam having abutment faces representative of the various digital values connected to each such register dial, a sensing member operable to sense the position of each cam, a resilient operator for biasing said sensing members into sensing engagement with said cams, a differentally positionable value setting member associated with each order of the keyboard, means operated by each sensing member for differentially positioning the ordinally related setting member in accordance with the value standing in the cam, projections on each of said setting members, cooperating shoulders on said keys, the projections being so arranged that positioning of said setting members is effective to place one of said projections vertically above the shoulder on the appropriate key, and means for depressing the setting members.

3. The apparatus of claim 2 comprising also a control key and means operated by said key to initiate sequentially the operation of said resilient operator and then the means for depressing the setting members.

4. The apparatus of claim 2 comprising also a control key, means operated by said control key for initiating operation of said resilient operator, means for latching said value setting members in adjusted position, a second control key, and means operated by said second control key for initiating operation of said means for depressing said setting members.

5. In a calculating machine having a register containing a plurality of ordinally arranged dials and a keyboard containing a plurality of ordinally arranged value keys, the combination which comprises a value cam having abutment faces representative of the various digital values affixed to each such register dial, a sensing member operable to sense the position of each cam, resilient operators for biasing said sensing members into sensing engagement with said cams, a differentially positionable value setting member associated with each order of the keyboard, means operated by the ordinally related sensing member for positioning said setting members, differentially spaced projections on each of said setting members, cooperating projections on said keys, the differential movement of said setting members from operation of said sensing members being effective to place one of said projections vertically above the projection on the appropriate key, means for initiating operation of said resilient operators, means for selectively latching said setting members in adjusted position, means for depressing the setting members, and a separate means for initiating operation of said means for depressing the setting members.

6. In a calculating machine having a register containing a plurality of ordinally arranged dials and a keyboard containing a plurality of ordinally arranged value keys, the combination which comprises a value cam having abutment faces representative of the various digital values affixed to each such register dial, a sensing member operative to sense the position of each cam, a resilient operator for biasing said sensing members into sensing engagement with said cams, a differentially positionable value setting member associated with each order of the keyboard, means operated by the ordinally related sensing member for positioning said setting members, differentially spaced projections on said setting members, cooperating projections on said keys, the movement of a setting member from operation of its sensing member being effective to place one of said projections vertically above the projection on the appropriate key, means for depressing the setting members, a first control means for initiating operation of said resilient operator and said means for depressing said setting members, means for latching said setting members in adjusted positions, and a control member for disabling operation of said means for depressing the setting members by said first control means and enabling said latching means, a second control means, and means operated by said second control means for initiating operation of said means for depressing said setting members.

7. In a calculating machine having an accumulator register containing a plurality of ordinally arranged accumulator dials, a counter register including a plurality or ordinally arranged counter dials, and an ordinally arranged keyboard, the combination which comprises a sensing slide associated with each of the corresponding orders of accumulator dials and counter dials, a set of value cams affixed to said accumulator dials and a set of value cams affixed to said counter dials, both sets of cams being adapted to be engaged by the ordinally related slide, means biasing said slides into engagement with one set of said cams, means for resiliently operating said sensing slides to sense the value in a set of cams, a key-selecting member associated with each sensing slide and operatively positioned thereby, projections on said key-selecting members, ears on said key stems, said projections and said ears being so arranged that movement of said setting member by its associated sensing slide is effective to place one of said projections over one of said ears, means for depressing the setting members, and means for operating said sensing slide against the bias of said biasing means to engage the other set of said cams.

8. In a calculating machine having an accumulator register containing a plurality of ordinally arranged accumulator dials, a counter register including a plurality of ordinally arranged counter dials, and an ordinally arranged keyboard, the combination which comprises a reciprocatable sensing slide associated with each order of accumulator dials and counter dials, a set of value cams connected to said accumulator dials and a set of value cams affixed to said counter dials, the cams of the related order of accumulator and counter dials being adapted to be engaged by movement of said slide in one direction, means biasing said slides into engagement with one set of said cams, means for operating said sensing slide against the bias of said biasing means to engage the other set of said cams, means for resiliently operating said sensing slides to sense the value in a set of cams, a key-selecting member associated with each sensing slide and operatively positioned thereby, projections on said setting member, ears on said keys, the operative movement of said setting member by its associated sensing slide being effective to place one of said projections above one of said ears, means for depressing the setting members, means for latching the setting members in adjusted position, a first means for initiating operation of said means for operating said sensing slides and said means for depressing the setting members, a manually settable member for disabling operation of said means for depressing the setting members by said first means, and a second means for operating said means for initiating operation of said means for depressing the setting members.

9. In a calculating machine having an accumulator register containing a plurality of ordinally arranged accumulator dials, a counter register including a plurality of ordinally arranged counter dials, and an ordinally arranged selection mechanism including a keyboard having ordinally arranged rows of keys, the combination which comprises ordinally arranged sensing slides each cooperating with the related order of accumulator and counter dials, a set of value cams affixed to said accumulator dials and a set of value cams affixed to said counter dials, the cams of each set having differentially positioned abutments representative of the various digital values and adapted to be engaged by the ordinally related slide, biasing means resiliently conditioning said slides for engagement with one set of said cams, means for conditioning said sensing slides against the bias of said biasing means for engagement with the other set of cams, means for resiliently operating said sensing slides to sense the values in one or the other of said sets of cams, and means controlled by said sensing means for operating the respective keys of said keyboard.

10. In a calculating machine having an accumulator register containing a plurality of ordinally arranged accumulator dials, a counter register including a plurality of ordinally arranged counter dials, and an ordinally arranged and differentially positionable selection mechanism, the combination which comprises ordinally arranged sensing slides each associated with the related order of accumulator and counter dials, a set of value cams connected to said accumulator dials and a set of value cams connected to said counter dials, the cams of each set having differentially positioned abutments representative of the various digital values and adapted to be engaged by the ordinally related slide, means for resiliently operating said sensing slides to sense the values in one or the other of said sets of cams, biasing means resiliently conditioning said slides for engagement with one set of said cams, means for conditioning said sensing slides against the bias of said biasing means for engagement with the other set of said cams, interponent means positioned by said sensing slides and operable to differentially position the ordinally related selection mechanism, and means for locking said interponent means in adjusted position during operations of the machine.

11. In a calculating machine having an accumulator register containing a plurality of ordinally arranged accumulator dials, a counter register including a plurality of ordinally arranged counter dials, an ordinally arranged and differentially positionable selection mechanism, and ordinally arranged and differentially positionable value storing members, the combination which comprises ordinally arranged sensing slides cooperable with the related order of accumulator and counter dials, a set of value cams affixed to said accumulator dials and a set of value cams affixed to said counter dials, the cams of both sets having differentially positioned abutment faces representative of the various digital values and adapted to be engaged by the ordinally related slide, means for resiliently operating said sensing slides to engage one or the other of said sets of cams, means resiliently conditioning said slides for engagement with one set of said cams, means for conditioning said sensing slides for engagement with the other set of said cams, means controlled by said sensing slides for differentially positioning the ordinally related value storing member, means for locking said value storage members in adjusted position during intervening operations of the machine, and means for selectively operating said value storage members to differentially position said selection mechanism.

12. In a calculating machine having ordinally arranged selection mechanisms and a register containing a plurality of ordinally arranged dials the combination which comprises ordinally arranged and differentially positionable value storage members adapted to be differentially operated in a direction along but not engaging the ordinally related selection mechanism, a value cam operatively connected to each such register dial, sensing members operable to sense the value standing in said cams, a manually controlled resilient operator for biasing said sensing members into sensing engagement with said cams, means operated by said sensing members for differentially positioning the ordinally related value storage members in accordance with the value standing in the ordinally related cams, means for locking said storage members in adjusted position during intervening operations of the machine, and a second manually controlled means for operating the value storage members in a second direction to engage said selection mechanism and thereby set the selection mechanism in accordance with the differential positions of said value storing members.

13. The apparatus of claim 12 comprising also a counter containing a plurality of ordinally arranged dials, a value cam operatively connected to each of said counter dials, means on said sensing members for engaging the ordinally related counter dial, and means for selectively operating said sensing members to engage either said register dial cams or said counter dial cams.

14. In a calculating machine having an accumulator register containing a plurality of ordinally arranged dials and a keyboard containing a plurality of ordinally arranged rows of keys of values "1" to "9," inclusive, the combination which comprises ordinally arranged and differentially positionable value storage members operative in a direction adjacent and parallel to but not engaging the ordinally related order of keys, differentially spaced engaging means on said storage members, cooperating engaging means on said keys, a value cam operatively connected to each such register dial, sensing members operable to sense the values standing in said cams, a manually controlled operator for resiliently biasing said sensing members into sensing engagement with said cams, means operated by said sensing members for differentially positioning the ordinally related value storage members, means for latching the value storage members in their adjusted positions, and a second manually controlled means for operating the value storage members in a direction substantially perpendicular to the first movement to cause the one of the spaced engaging means on the storage members to engage the cooperating engaging means on the keys and thereby set the keys in accordance with the differential positions of said value storage members.

References Cited in the file of this patent

UNITED STATES PATENTS

| | | |
|---|---|---|
| 388,117 | Burroughs | Aug. 21, 1888 |
| 824,416 | Earnist | June 26, 1906 |
| 910,806 | Falvey | Jan. 26, 1909 |
| 952,257 | Jahnz | Mar. 15, 1910 |
| 1,910,201 | Cordt | May 23, 1933 |
| 1,941,309 | Koch | Dec. 26, 1933 |
| 2,305,780 | Henzelmann | Dec. 22, 1942 |
| 2,325,388 | Friden | July 27, 1943 |
| 2,399,170 | Chase | Apr. 30, 1946 |
| 2,714,989 | Ellerbeck | Aug. 9, 1955 |

FOREIGN PATENTS

| | | |
|---|---|---|
| 583,601 | Germany | Sept. 6, 1933 |
| 602,353 | Germany | Sept. 8, 1934 |
| 203,473 | Switzerland | Mar. 15, 1939 |